United States Patent [19]

Sakata et al.

[11] Patent Number: 4,458,423

[45] Date of Patent: Jul. 10, 1984

[54] HEIGHT GAUGE

[75] Inventors: Hideo Sakata; Shingo Nishina; Hiroshi Yamashiro, all of Kawasaki, Japan

[73] Assignee: Mitutoyo Mfg. Co., Ltd., Tokyo, Japan

[21] Appl. No.: 405,004

[22] Filed: Aug. 4, 1982

[30] Foreign Application Priority Data

Aug. 10, 1981 [JP] Japan .......................... 56-118471[U]
Aug. 10, 1981 [JP] Japan .......................... 56-124924

[51] Int. Cl.³ .............................................. G01B 5/02

[52] U.S. Cl. ............................... 33/169 R; 33/143 K; 33/165

[58] Field of Search ................. 33/169 R, 172 R, 165, 33/172 E, 169 B, 143 K, 439

[56] References Cited

U.S. PATENT DOCUMENTS

| | | | |
|---|---|---|---|
| 2,521,934 | 9/1950 | Mitchell | 33/143 K |
| 2,551,671 | 5/1951 | Harris | 33/439 |
| 3,251,133 | 5/1966 | Turtschan | 33/169 R |
| 4,097,996 | 7/1978 | Yamazawa et al. | 33/172 R |

FOREIGN PATENT DOCUMENTS

| | | | |
|---|---|---|---|
| 1354153 | 1/1964 | France | 33/143 K |
| 603347 | 6/1948 | United Kingdom | 33/169 R |

*Primary Examiner*—William D. Martin, Jr.
*Attorney, Agent, or Firm*—Flynn, Thiel, Boutell & Tanis

[57] ABSTRACT

A height gauge wherein a control wheel of a driving mechanism for moving a slider at high speed is secured to the slider, and a finger grip of a fine adjustment mechanism for driving the driving mechanism at low speed so as to move the slider at low speed is mounted on the control wheel.

7 Claims, 5 Drawing Figures

HEIGHT GAUGE

BACKGROUND OF THE INVENTION

1. Field of the Invention

This invention relates to height gauges, and more particularly to improvements in a mechanism for finely adjusting the movement of a slider used when the slider is vertically moved along supports.

2. Description of the Prior Art

To finely adjust the movement of a slider of a height gauge, heretofore, there has been commonly practiced that a feed box formed separately of the slider is vertically movably provided on a support for vertically movably supporting the slider, the rough adjustment is performed in such a manner that a control wheel for vertically moving the slider, is operated in a state where the slider and the feed box are integrated by means of a fine adjustment screw, or the slider is directly grasped to vertically move the slider at high speed, thereafter, the feed box is affixed to the support, and the fine adjustment screw is adjusted to effect a screw-feed under this condition, whereby the slider is vertically moved at low speed relative to the feed box, thus enabling to perform the fine adjustment.

Or, a guide support is formed separately of and in parallel to the support vertically movably supporting the slider, the rough adjustment is performed in such a manner that a control wheel for vertically moving the slider is operated or the slider is directly grasped to vertically move the slider at high speed, then, the slider is affixed to the guide support by means of a set-screw and the like, and thereafter, the guide support itself is vertically moved at low speed by means of the fine adjustment screw provided on a base, so that the fine adjustment can be performed.

However, the height gauge having the conventional fine adjustment mechanism, wherein the fine adjustment mechanism for finely adjusting the slider is provided entirely separately of a mechanism vertically moving the slider at high speed without utilizing it at all, presents such disadvantages that construction of the height gauge as a whole tends to be complicated and the number of parts constituting the height gauge is large. Moreover, in order to perform the fine adjustment after the slider is vertically moved at high speed by operating the control wheel and so forth, it is necessary for an operator to transfer one of his hands from the control wheel to a portion of the feed box, etc. other than the slider, e.g., the fine adjustment screw or the like provided on the feed box for the measuring operation, and hence, the height gauge of the type described has not been suitable for a quick measuring operation. Because of this, necessity has been voiced for a height gauge in which a fine adjustment is performed quickly after the rough adjustment, and particularly, there has been a very strong demand for such a performance with a high accuracy reading height gauge of a digital indication type, in which a photoelectric encoder or the like is adopted.

SUMMARY OF THE INVENTION

The present invention has as its object the provision of a height gauge excellent in controllability, wherein a fine adjustment can be quickly effected after the rough adjustment.

To achieve the above-described object, the present invention contemplates that there are provided a slider driving mechanism having a control wheel formed on the slider for vertically moving the slider and a fine adjustment mechanism for driving the driving mechanism at low speed so as to drive the slider at low speed relative to support or supports, a finger grip of this fine adjustment mechanism is formed on the control wheel, the control wheel or a grip portion of the control wheel is operated during the measuring to effect a rough adjustment, and then, the finger grip formed on the control wheel is operated to perform fine adjustment.

DETAILED DESCRIPTION OF THE PREFERRED EMBODIMENTS

Figure 1:
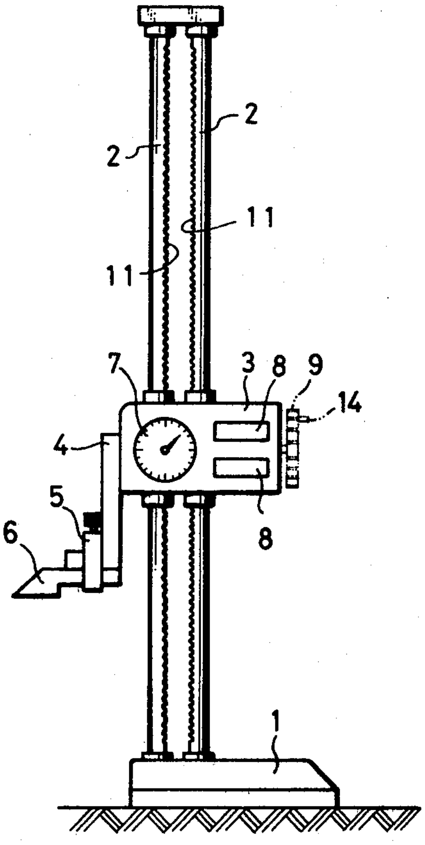
FIG. 1 is a front view showing the general arrangement of one embodiment of the height gauge according to the present invention.
Figure 2:
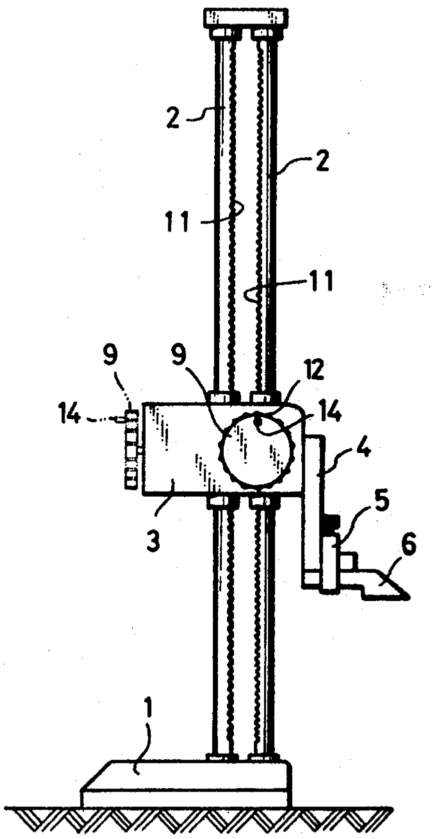
FIG. 2 is a rear view of FIG. 1.
Figure 3:
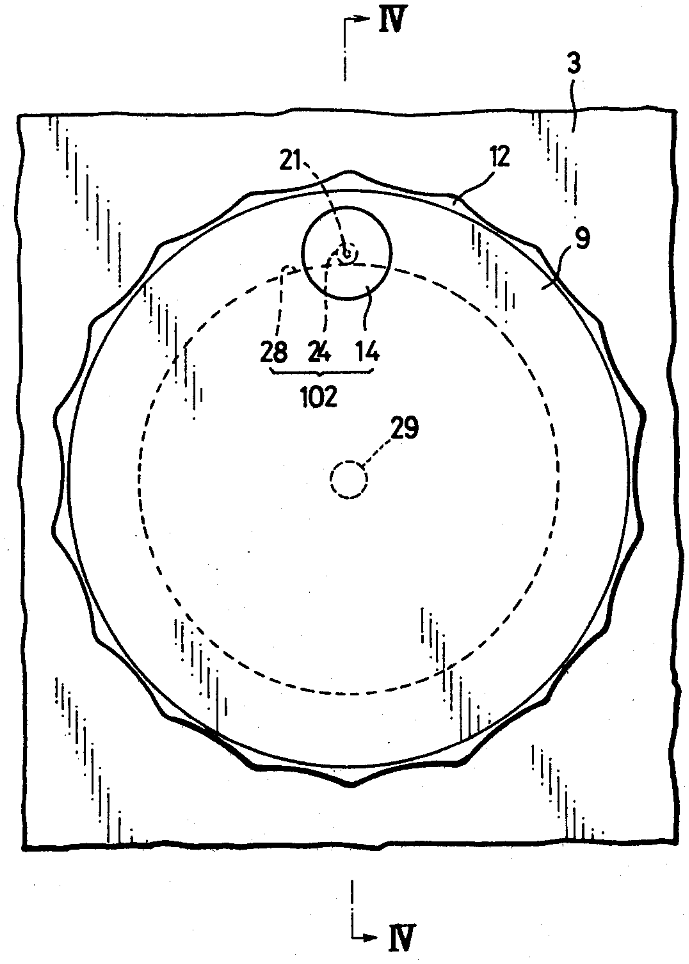
FIG. 3 is an enlarged view showing the essential portions of FIG. 2.

FIGS. 1 and 2 show the general arrangement of one embodiment of the height gauge according to the present invention, in which a slider 3 is movably supported on two supports 2 planted in a base 1.

Affixed to one side surface of the slider 3 is a scriber jaw 4, to which is mounted a scriber 6 through a clamp 5. Provided at the front surface of the slider 3 are a pointer type analogue instrument 7 and a digital instrument 8 as being indicators for indicating a movement value and the like of the slider 3 along the supports 2 (Refer to FIG. 1).

Figure 4:
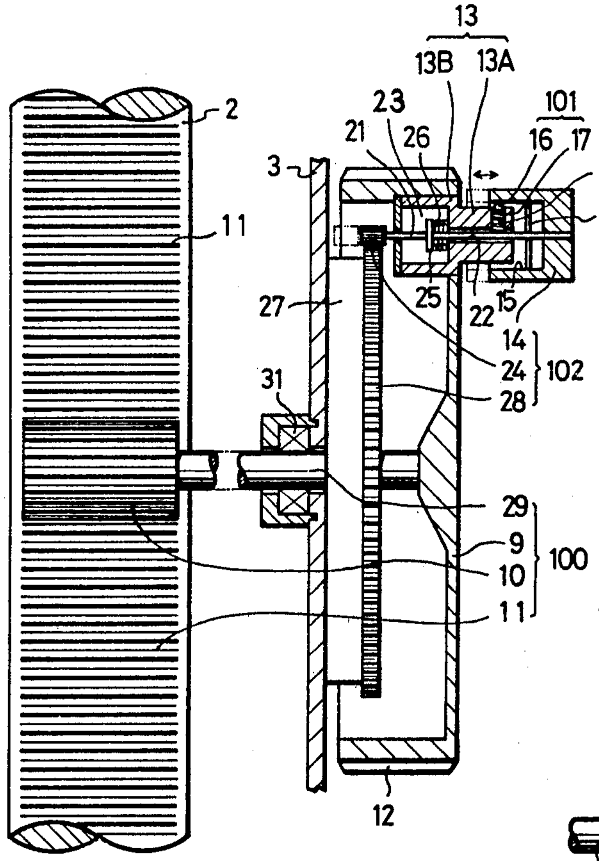
FIG. 4 is a sectional view taken along the line IV—IV in FIG. 3.

Provided at the rear surface of the slider 3 is a control wheel 9, to which is connected a drive gear 10 to be meshed with racks 11 notchingly provided on the supports 2 through a drive shaft 29 (Refer to FIG. 4). The drive shaft 29 is rotatably journalled on the slider 3 through a bearing portion 31, and one end of the drive shaft 29 is affixed to the center portion of the control wheel 9. Here, the drive gear 10, the rack 11, the drive shaft 29 and the control wheel 9 constitute a driving mechanism 100 capable of moving the slider 3 relative to the supports 2. Further, a position of the control wheel 9 mounted on the slider 3 may be on an end face just opposite to the end face, onto which the scriber 6 is secured as indicated by two-dot chain lines in FIGS. 1 and 2, or the control wheel 9 may be mounted onto any one of various suitable positions depending upon the relation between the control wheel 9 and the internal mechanism of the slider 3 and so forth.

The control wheel 9 is formed into a substantially round tray shape being open toward the slider 3, and provided on the outer peripheral portion thereof with a grip portion 12 formed into a substantially polygonal shape for facilitating to directly grip the control wheel 9.

As enlargedly shown in FIG. 4, a stepped columnar guide member 13 having two outer diameters different from each other is embedded at a predetermined portion near the outer periphery of the control wheel 9. A small diameter portion 13A of this guide member 13 projects from a side surface of the control wheel 9 to the right in the drawing and a large diameter portion 13B is positioned to extend toward the side of the slider 3 and in the state of being embedded in the control wheel 9. Coupled onto the small diameter portion 13A projected from the control wheel 9 of this guide member 13 is a bottomed tubular finger grip 14 movable toward the slider 3 in the drawing.

An engaging mechanism 101 comprises an engaging portion 16 in the form of a small engaging piece which is disposed at a predetermined position axially along the inner peripheral surface 15 of the finger grip 14 in such a manner that the engaging portion 16 can be brought into frictional abutment with the inner peripheral surface 15. This engaging portion 16 is received in a small hole 13C penetrated in the small diameter portion 13A in the radial direction thereof and is biased outwardly in the radial direction of the small diameter portion 13A by a spring 17 provided at the bottom of the small hole 13C. Here, the engaging portion 16 and the spring 17 constitute the engaging mechanism 101, through the agency of which the finger grip 14 can be brought into frictional abutment with the guide member 13 at a predetermined position.

A circular groove 18 is formed at a predetermined position near the bottom of the inner peripheral surface 15 along the circumference, and the top portion of the engaging portion 16 is adapted to be comparatively shallowly coupled into this circular groove 18 when the finger grip 14 advances a predetermined value toward the slider 3 in the drawing.

Provided at the bottom of the finger grip 14 is a pinion shaft 21 having a predetermined length, disposed in parallel to the drive shaft 29 and directed to the slider 3, and this pinion shaft 21 is inserted through a support hole 22 of the guide member 13 and a hollow portion 23 provided closer to the slider 3 than the support hole 22, further extended, and affixed at one end thereof on the side of the slider 3 with a pinion 24.

A receiving portion 25 such as a C-shaped washer is affixed to a predetermined portion of the pinion shaft 21 in the hollow portion 23, a compression coil spring 26 as being biasing means is confined between the right end face of the hollow portion 23 in the right in FIG. 4 and the receiving portion 25, and the finger grip 14 and the pinion 24 are biased toward the position of the slider 3 as indicated by two-dot chain lines in the drawing by this compression coil spring 26.

In a state where the finger grip 14 is pulled in the direction away from the slider 3 as indicated by solid lines in FIG. 4, the pinion 24 is adapted to be meshed with a gear portion 28 formed into a spur gear form, which is larger in diameter than the pinion 24. This gear portion 28 is affixed to the slider 3 through a hub portion 27, and the drive shaft 29 is inserted through the center portion of the gear portion 28. Here, the gear portion 28, the finger grip 14 and the pinion 24 constitute a fine adjustment mechanism 102.

In a state where the finger grip 14 is pulled in a direction away from the slider 3 and remains static so as to mesh the pinion 24 with the gear portion 28 (Refer to the solid line portion in FIG. 4), the finger grip 14 is frictionally engaged due to a frictional force of the engaging portion 16 frictionally abutted against the inner peripheral surface 15, whereby the pinion 24 is maintained in mesh with the gear portion 28. However, if the static frictional engagement between the engaging portion 16 and the inner peripheral surface 15 is lost due to rotation of the control wheel 9 or the like, then the finger grip 14 moves toward the slider 3 due to the biasing force of the coil spring 26, whereby the pinion 24 is adapted to be released from the gear portion 28.

Description will hereunder be given of operation of the present embodiment.

In a normal state where the finger grip 14 is not pulled, the finger grip 14 and the pinion 24 are moved to the side of the slider 3 through the resiliency of the coil spring 26, whereby the pinion 24 is in a state of being released from the gear portion 28 (Refer to the two-dot chain line portion in FIG. 4). In this state, if the grip portion 12 of the control wheel 9 is directly grasped or the finger grip 14 is gripped to rotate the control wheel 9, then the slider 3 is moved along the supports 2 at high speed, so that the rough adjustment can be performed. In this case, in the finger grip 14, the engaging portion 16 is coupled into the circular groove 18 to be held at a position indicated by two-dot chain lines in FIG. 4; this avoids accidental disadvantageous linear movement of the pinion shaft 21, which in turn impinging of the pinion 24 on the gear portion 28 in a manner to interfere with smooth rotation of the control wheel 9 and smooth movement of the slider 3.

If the finger grip 14 is pulled to the right in FIG. 4 after the rough adjustment has been performed as described above, then the pinion 24 and the gear portion 28 are brought into meshing engagement with each other. If the finger grip 14 is rotated under the above-described meshing engagement, then the pinion 24 is moved in the circumferential direction of the gear portion 28 because the gear portion 28 is affixed to the slider 3, whereby the control wheel 9 is rotated and the driving mechanism 100 is driven by the drive shaft 29 at low speed, so that the slider 3 can be finely adjusted. In this case, if the rough adjustment would have been performed with the finger grip 14 being gripped in the state where the finger grip 14 was not pulled, then, in performing the fine adjustment, the portion to be operated (the gripped portion) would remain in the same position. Even when the grip portion 12 is directly grasped to operate the control wheel 9 for the rough adjustment, transfer from the rough adjustment to the fine adjustment can be facilitated because the finger grip 14 is provided on the control wheel 9 and the portion to be operated for the fine adjustment is disposed close to the portion operated for the rough adjustment.

When the rough adjustment is attempted again upon completion of the fine adjustment, if the finger grip 14 is pushed toward the slider 3, then the pinion 24 is released from the gear portion 28. However, without pushing the finger grip 14 toward the slider 3, rotation of the control wheel 9 causes the abutting portion of the engaging portion 16 against the inner peripheral surface 15, both of which have been in static frictional condition, to move into a dynamic frictional condition, whereby the finger grip 14 cannot resist the biasing force of the coil spring 26 to be moved to the side of the slider 3, so that the pinion 24 can be released from the gear portion 28.

In addition, when the finger grip 14 is disposed at a position indicated by solid lines in FIG. 4, and the pinion 24 and the gear portion 28 are meshed with each other, even if a hand is released from the finger grip 14, mere release of the hand does not permit the pinion 24 to be released from the gear portion 28 because the engaging mechanism 101 is provided on the finger grip 14. In consequence, when the hand is released from the finger grip 14 during fine adjustment and thereafter the finger grip 14 is to be operated, there is no need for pulling the finger grip 14 again to the right in FIG. 4.

The present embodiment with the above-described arrangement can offer the following advantages.

There are such advantages that the transfer operation from the rough adjustment to the fine adjustment or from the fine adjustment to the rough adjustment can be effected very quickly, and particularly, when the finger grip 14 is gripped to rotate the control wheel 9 for the rough adjustment in a state where the pinion 24 is released from the gear portion 28, even if the process is transferred from the rough adjustment to the fine adjustment, the finger grip 14 is operated likewise, thus enabling to offer the advantage of a remarkable extent.

Moreover, in performing the rough adjustment, the pinion 24 is reliably released from the gear portion 28 because the engaging portion 16 is coupled into the circular groove 18. Hence, when the finger grip 14 is gripped to rotate the control wheel 9, the pinion 24 can avoid accidentally impinging on the gear portion 28 and so forth, thereby offering such an advantage that the rough adjustment is facilitated.

Since the pinion 24 is normally in the state of being released from the gear portion 28 as described above, such advantages can be offered that no noises of meshing engagement occur between the pinion 24 and the gear portion 28 during rough adjustment, so that the rough adjustment is performed quietly and vibrations are minimized.

Further, the feed box, the guide support and the like for the fine adjustment are not provided entirely separately of the mechanism for the rough adjustment as in the conventional height gauge, so that such an advantage can be offered that the number of parts is reduced, thus resulting in improved workability during assembling work and the like.

Furthermore, such an advantage can be offered that rotation of the control wheel 9 automatically releases the frictional engagement between the engaging portion 16 and the inner peripheral surface 15 due to a static frictional force, not requiring to push the finger grip 14 toward the slider 3 from the state where the pinion 24 is meshed with the gear portion 28 and so forth, whereby the pinion 24 is automatically released from the gear portion 28, thus resulting in excellent controllability.

Figure 5:
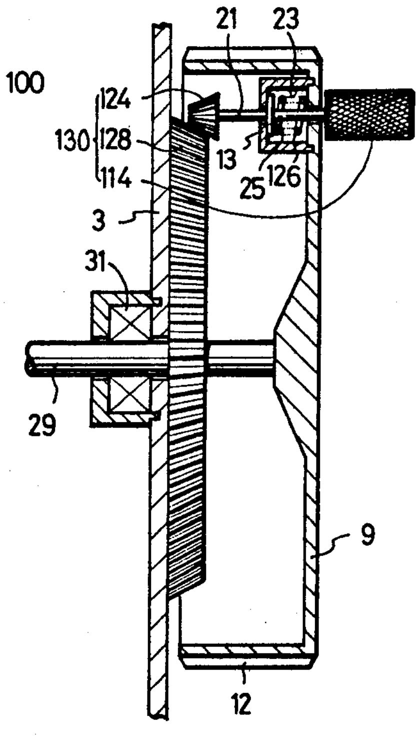
FIG. 5 is a sectional view showing the essential portions of an embodiment other than the above.

In addition, in the above-described embodiment, when the finger grip 14 is pulled in the direction away from the slider 3, the pinion 24 is brought into meshing engagement with the gear portion 28. Thus, the pinion 24 is normally in the state of being released from the gear portion 28. However, such an arrangement may be adopted that, as in another embodiment shown in FIG. 5, a pinion 124 is normally in meshing engagement with a gear portion 128 by means of a coil spring 126 as being biasing means, and, when a finger grip 114 is pulled against the resiliency of the coil spring 126 in a direction opposite to the slider 3, the pinion 124 is released from the gear portion 128. In this case, the pinion 124 and the gear portion 128 may be formed of a pair of bevel gears. In this embodiment, a finger grip 114, a pinion 124 and a gear portion 128 constitute a fine adjustment mechanism 130.

Furthermore, in the above-described embodiments, such an arrangement has been adopted that the pinion 24 or 124 is moved in the axial direction of the pinion shaft 21 and adapted to be meshed with or released from the gear portion 28 or 128, however, this arrangement may be replaced by an arrangement in which the finger grip 14 and the pinion 24 or 124 may be engaged with or released from each other at the intermediate portion of the pinion shaft 21.

Further, the driving mechanism 100 and the fine adjustment mechanism 102 or 130 have been adapted to cooperate with or be released from each other, however, this arrangement may be replaced by one in which the driving mechanism and the adjustment mechanism cooperate with each other at all times, in which case, a second finger grip for rotating the control wheel 9 may be provided on the control wheel 9 separately of the aforesaid finger grip 14.

Furthermore, the pinion 24 or 124 and the gear portion 28 or 128 may be replaced by a small friction wheel and a large friction wheel made of a material high in frictional resistance, or any other arrangement may be adopted. In short, it suffices to adopt a mechanism capable of finely adjusting the movement of the control wheel 9.

Further, the supports 2 are formed two members in the above-described embodiments, however, the number of supports may be one or more than three.

As has been described hereinabove, the present invention can provide a height gauge high in controllability, capable of performing the fine adjustment quickly after the rough adjustment.

What is claimed is:

1. A height gauge comprising:

a slider movably supported on a support or supports erected in a base;

a driving mechanism for moving said slider relative to said support or supports; and a fine adjustment mechanism for driving said driving mechanism at low speed so as to move said slider relative to said support or supports at low speed;

said driving mechanism including a driving shaft disposed on said slider, a drive gear on said driving shaft and engaged with a rack on said support, and a control wheel mounted on one end of said driving shaft for driving said drive gear;

said fine adjustment mechanism including a large diameter gear portion nonrotatably affixed to said slider, a pinion engageable with said gear portion, and a finger grip connected to said pinion and secured to said control wheel in a manner to be movable in the axial direction of said pinion; wherein said driving mechanism and said fine adjustment mechanism cooperate or are released from each other as said finger grip moves in said axial direction.

2. A height gauge as set forth in claim 1, further comprising biasing means for biasing said pinion along the axis of said pinion in a direction to bring said pinion into meshing engagement with said gear portion.

3. A height gauge as set forth in claim 1, further comprising biasing means for biasing said pinion along the axis of said pinion in a direction to release said pinion and said gear portion from each other.

4. A height gauge comprising:

a slider movably supported on a support or supports erected in a base;

a driving mechanism for moving said slider relative to said support or supports; and a fine adjustment mechanism for driving said driving mechanism at low speed so as to move said slider relative to said support or supports at low speed;

said driving mechanism including a rack fixed on a said support, a drive gear to be meshed with said rack, a drive shaft affixed at one end thereof with said drive gear and journalled on said slider, a control wheel affixed to the other end of said drive shaft;

said fine adjustment mechanism including a large diameter gear portion nonrotatably affixed to said slider, said drive shaft extending concentrically through said large diameter gear portion, a finger grip provided on said control wheel in a manner to be movable in a direction parallel to said drive shaft, and a pinion connected to said finger grip and capable of being meshed with said gear portion; and further comprising:

biasing means for biasing said finger grip in a direction of separating said pinion from said gear portion; and an engaging mechanism for engaging said finger grip with said control wheel in such a manner that the meshing engagement between said pinion and said gear portion is maintained against the biasing force of said biasing means.

5. A height gauge as set forth in claim 4, wherein said finger grip is movably coupled onto a columnar guide member affixed to said control wheel, and said engaging mechanism comprising an engaging portion formed as a small piece supported on said guide member in a manner to be linearly movable in the radial direction of said guide member and a spring for frictionally abutting said engaging portion against said finger grip.

6. A height gauge comprising:

a support upstanding on a base;

a slider supported on said support for movement therealong;

a driving mechanism including a control wheel rotatably mounted on said slider and manually engageable for rotating, and drive means operatively interposed between said support and said control wheel and responsive to said rotation of said control wheel for moving said slider along said support in a rough position adjustment;

a fine adjustment mechanism including finger grippable means mounted on said control wheel for (1) rotation with said control wheel about the axis of said control wheel and (2) rotatable with respect to said control wheel about an axis of said finger grippable means, and interengageable gear means (1) fixed on said slider for rotation of said control wheel thereabout and (2) rotatably drivable by rotation of said finger grippable means about said axis of said finger grippable means and with respect to said control wheel for fine adjustment of the rotative position of said control wheel with respect to said slider and hence for fine adjustment of said slider along said support.

7. A height gauge as set forth in claim 6, in which said finger grippable means is axially slidable with respect to said control wheel for shifting said interengageable gear means between positions of engagement and disengagement, spring means for biasing said finger grippable means into one of said position, friction means sufficient to hold said finger grippable means in its other position against loading of said spring means with said control wheel in a fixed position with respect to said slider but responsive to rough rotational adjustment of said control wheel with respect to said slider for overcoming said frictional holding and permitting said spring means to shift said finger grippable means to its spring biased position, said spring biased position being that at which said interengageable gear means are disengaged for direct manual rotation of said control wheel to accomplish rough adjustment of said slider with respect to said support.

* * * * *